Figure 3:
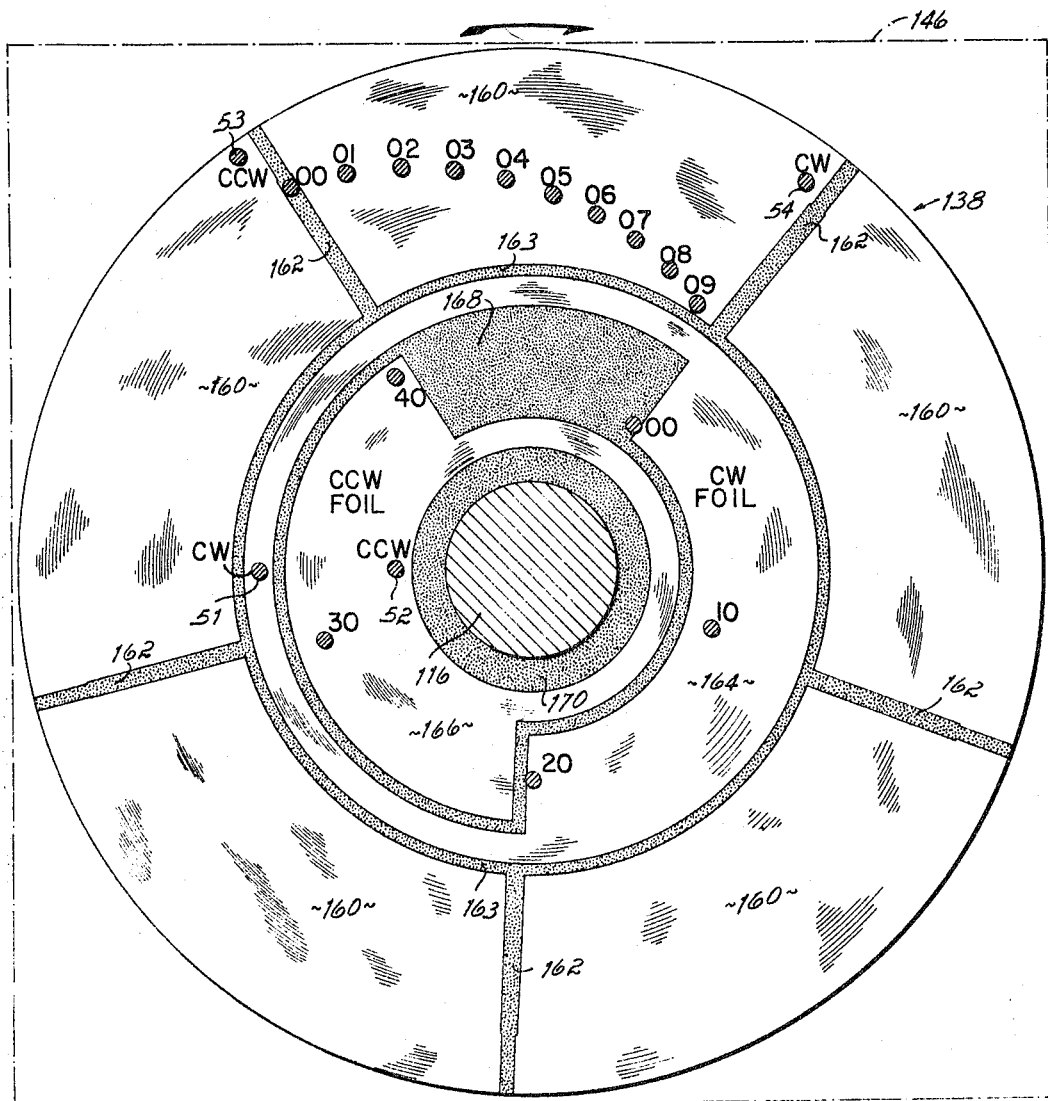

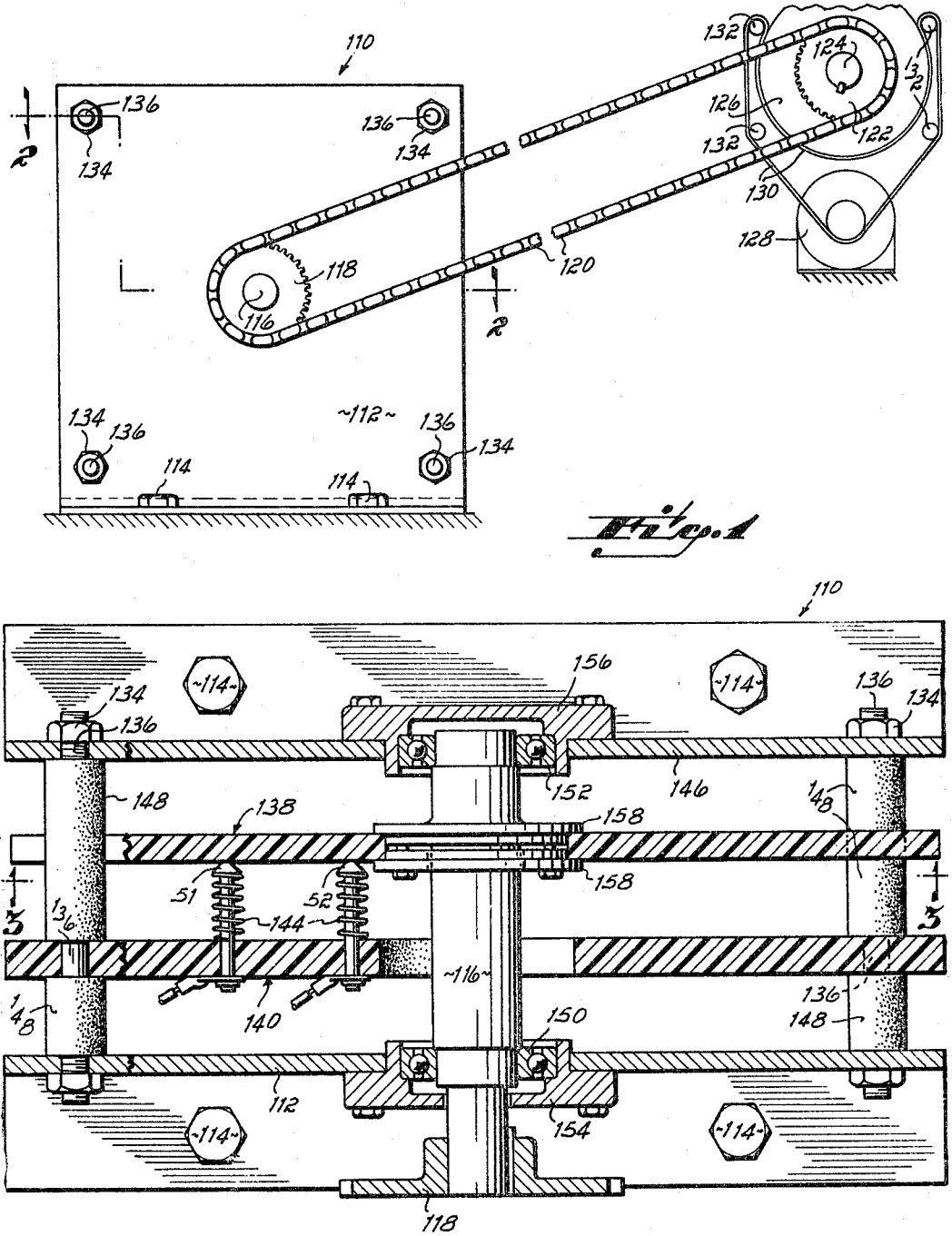

INVENTORS
Siegfried K. Handel
Robert A. Lasley
BY Wood, Herron & Evans
ATTORNEYS Aug. 2, 1966  S. K. HANDEL ETAL  3,264,419
CONTROL SYSTEM AND DIGITAL SELECTOR SWITCH
Filed March 31, 1965  7 Sheets-Sheet 5

INVENTORS
Siegfried K. Handel
BY Robert A. Lasley
Wood, Herron & Evans
ATTORNEYS Aug. 2, 1966  S. K. HANDEL ETAL  3,264,419
CONTROL SYSTEM AND DIGITAL SELECTOR SWITCH
Filed March 31, 1965  7 Sheets-Sheet 7
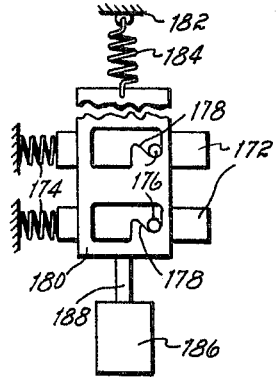
Fig. 8
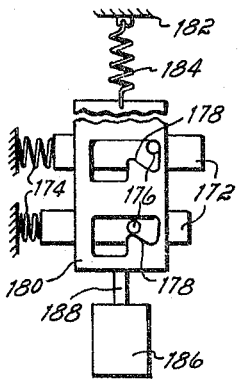
Fig. 9
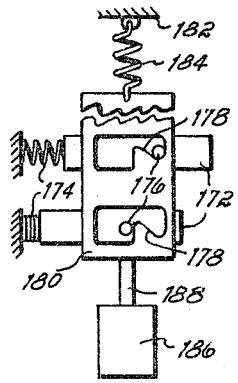
Fig. 10
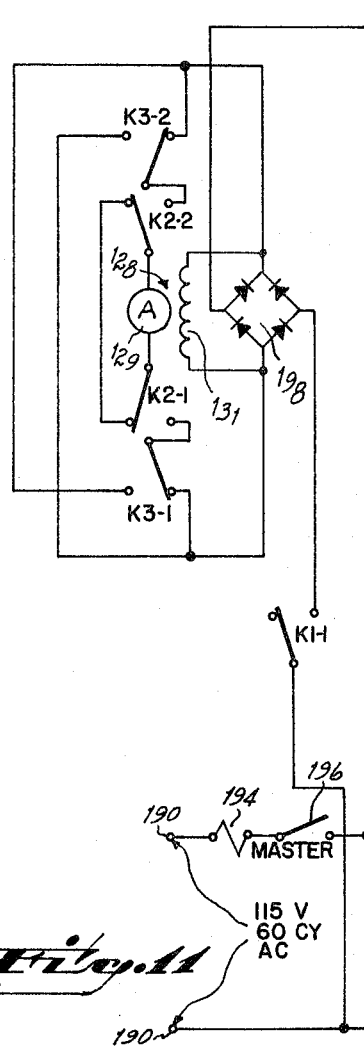
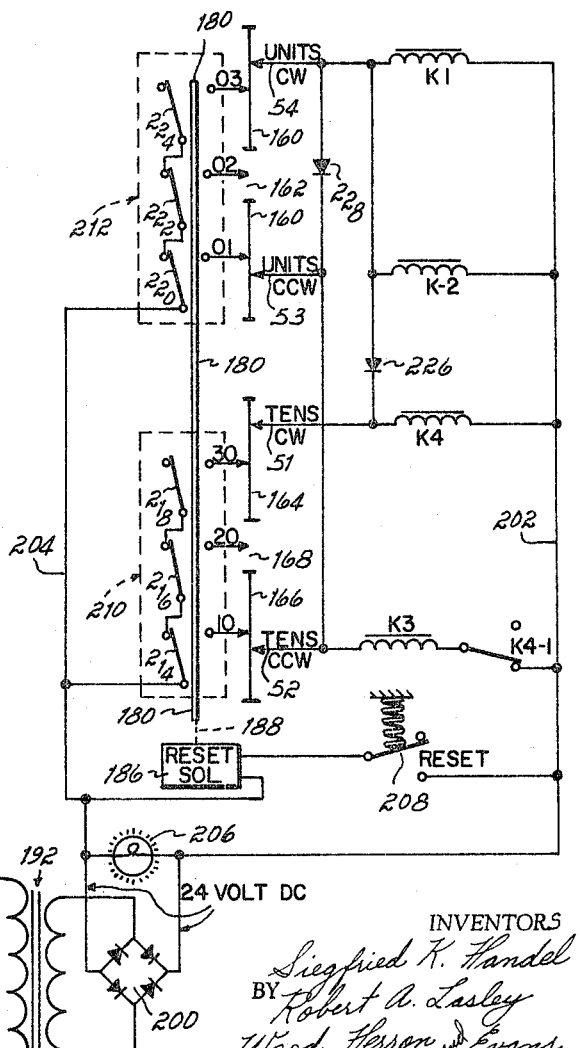
Fig. 11
INVENTORS
Siegfried K. Handel
Robert A. Lasley
BY Wood, Herron and Evans
ATTORNEYS United States Patent Office 3,264,419
Patented August 2, 1966

3,264,419
CONTROL SYSTEM AND DIGITAL
SELECTOR SWITCH
Siegfried K. Handel and Robert A. Lasley, Hamilton, Ohio, assignors to The Mosler Safe Company, Hamilton, Ohio, a corporation of New York
Filed Mar. 31, 1965, Ser. No. 444,143
14 Claims. (Cl. 200—11)

This invention relates in general to an electrical switching apparatus, and more specifically to a novel digital selector switch for controlling the energization of a bi-directional load device in accordance with selected input information. The switch also maintains the load device energized through at least two distinct phases of operation until a desired position has been reached in satisfaction of the input information.

The switching apparatus of this invention is particularly, although by no means exclusively, adapted to be used in connection with a card filing system of the type disclosed in application Ser. No. 279,260, filed on May 9, 1963, and assigned to the assignee of the present invention, and the specification of said application is incorporated herein by reference. Essentially, such a card filing system comprises a rotatable drum having 50 separate storage pockets around its periphery, any selected one of which may be indexed to an access station via the shortest path, either clockwise or counterclockwise, for individual file card insertion or ejection. The drum is rotated by a drive motor whose energization is controlled through a switching device in either the forward or reverse direction dependent upon both the present drum position and the desired new position, as determined by a pocket and card selection keyboard.

The keyboard is provided with 4 rows of depressable buttons or keys for selecting the units and tens digits of both a desired storage pocket and an individual edge coded file card within the pocket, and in addition includes master start, reset and card return keys. The digital selector switch of this invention constitutes an improvement over the one disclosed in the above application, and derives two of its inputs from the units and tens rows on the keyboard for implementing the pocket selection function.

It is a primary object of this invention to provide a digital selector switch for energizing a movable load device in either one of two directions dependent upon selected input information.

It is a further object of this invention to provide a novel digital switch that is effective to maintain a movable load device energized through at least two distinct phases of operation until a desired position is reached in the most expeditious manner, i.e., via the shortest of two possible paths.

It is a further object of this invention to provide such a digital selector switch which includes a single rotatable commutator disc having spaced conductive and nonconductive areas that cooperates with a stator member carrying a plurality of contact pins, and in which the commutator disc is itself driven by the movable load device.

It is a further object of this invention to provide such a digital selector switch that is particularly adapted to be used in the card filing system of the type disclosed in the above application for controlling the indexing of a rotatable storage drum with respect to an access station.

These and other objects of this invention are realized, in a preferred embodiment, by means of a switching apparatus of the above type in which one surface of the commutator disc is provided with a first annular area concentrically nested within a second annular area. The first area contains two electrically conductive portions, again having generally annular configurations and one being nested within the other, separated by a closed path of nonconductive material. The second annular area contains five equally dimensioned segments of conductive material spaced from each other and from the first area by a hub and spoke pattern of nonconductive material. The stator member is mounted parallel to the commutator disc and carries first and second sets of electrical contact pins respectively engageable with the first and second annular areas of the disc. The first set includes five pins for representing the tens digit of the 50 storage pockets in the drum and the second set includes ten pins for representing the units digits of the pockets. Each set also includes CW and CCW pins for determining the direction of rotation of the drum to index a selected pocket to the access station via the shortest path.

When the units and tens keys of a pocket to which access is desired are depressed at the keyboard, a circuit path is completed in the switch from the selected tens pin in the first annular area to one of the associated CW or CCW pins. This energizes certain relays which in turn activate the drive motor of the drum for rotation in the proper direction. This first phase of operation continues until the commutator disc, which is chain and sprocket driven by the drum, has rotated to a point where the selected tens pin enters the nonconductive portion of the first annular area, thus opening the previously completed circuit path. By this time, however, one of the conductive segments in the second annular area has been driven to a position where it completes a further circuit path from the selected units pin to an associated directional pin, which maintains the appropriate relays energized to continue the drum rotation in the same direction. This second phase of operation, under the control of the units pin, continues until said pin enters a nonconductive portion on the spoke pattern, at which time the motor control relays are de-energized and the drum rotation is stopped with the selected pocket at the access station.

To facilitate a better understanding of the invention, reference is now made to the following description of a preferred embodiment thereof taken in conjunction with the drawings, in which:

FIGURE 1 shows a side view of the enclosed digital selector switch of the invention with its drive connections to the storage drum, FIGURE 2 shows a top sectional view of the switch taken along line 2—2 in FIGURE 1, FIGURES 3–7 show side sectional views of the switch taken along line 3—3 in FIGURE 2 and illustrate the commutator disc in various rotational positions, FIGURES 8–10 show an individual key construction which may be employed and further illustrate a key latching feature is sequential stages of operation, and FIGURE 11 shows a schematic diagram of the drive motor circuit including the control relays, their associated contact arms and the selector switch components.

Referring now to FIGURE 1, the digital selector switch 110 of the invention includes a first L shaped end plate 112 mounted on a stationary base by bolts 114. A centrally positioned shaft 116 is keyed to a driven sprocket 118 which is linked by chain 120 to a driving sprocket 122, the latter being keyed to a shaft 124 of the storage drum 126. Both of the sprockets have equal numbers of teeth so that the switch shaft is always rotated the same number of degrees as the drum and in synchronization therewith. The drum is driven by a stationary mounted motor 128 through an endless drive belt 130 and idler pulleys 132. The nuts 134 threaded over the ends of corner rods 136 extending through the end plate 112 serve to mount the internal switch components.

The internal structure of the switch 110, as seen in FIGURE 2, includes a rotatable commutator disc 138 and a cooperating, stationary stator member 140. The latter serves as a mounting board for a plurality of electrical contact pins 142 urged against one surface of the commutator disc by helical expansion springs 144. Whereas actually there is a total of nineteen such contact pins mounted on the stator member 140 in various positions, only two of them 51, 52 are shown in FIGURE 2 in the interest of simplicity. The stator member is mounted on the corner rods 136 between the first end plate 112 and a second end plate 146, and is rigidly held in the position shown by spacer sleeves 148. The stator is fabricated from an insulating or nonconductive material, and is generally square shaped to match the end plates with a circular cutout in its center through which the switch shaft 116 extends. This shaft is journalled for rotation in ball bearing units 150 and 152, which are in turn secured to mounting rings 154 and 156 respectively bolted to the end plates 112 and 146. The commutator disc 138 is also provided with a circular cutout in its center, the edges of which are securely clamped between flanges 158 integral with the shaft 116 so that the disc rotates with the shaft. The disc is similarly fabricated from an insulating material, but its pin contacting surface is provided with a plurality of electrically conductive areas, as more clearly shown in FIGURES 3–7.

These figures are all taken along line 3—3 of FIGURE 2 and show the active or pin contacting surface of the commutator disc in various rotational positions, as will be more fully developed below in connection with an operational description of the invention. As may be seen in either of FIGURES 3–7, the active surface of the commutator disc includes five equally dimensioned conductive segments 160 arranged in an annular configuration around the outer periphery of the disc and spaced from each other by nonconductive strips 162 laid out in a hub and spoke pattern. Actually, these nonconductive strips represent the body or substrate of the disc proper, while the conductive segments are plated, sprayed, or otherwise deposited layers of electrically conductive material, such as copper. The inner area of the active surface of the commutator disc is insulated from the outer conductive segments 160 by the hub strip 163 and includes a CW foil 164 and a CCW foil 166. Both foils are generally annular in shape with relatively wide and narrow portions formed in such a manner that the CCW foil 166 is nested within the CW foil 164 but electrically insulated therefrom by a further nonconductive area 168. The cross-hatched circle in the center of the disc of FIGURE 3 represents the switch shaft 116, which is itself held out of electrical contact with the conductive surfaces of the disc by a ring shaped area of insulation 170.

The small cross-hatched circles spaced around the commutator disc at various positions and labeled with either CW, CCW or numeric designations below one hundred represent the electrical contact pins that are mounted on the stator member and urged against the disc by their expansion springs 144, and it will be noted that these contact pins have the same respective positions throughout FIGURES 3–7. Their precise function and manner of cooperation with the conductive and nonconductive areas of the commutator disc will be more fully developed below. To facilitate a description of the invention, these contact pins will hereinafter be designated with "tens" and "units" prefixes. Thus, the tens 20 pin in FIGURE 3 will refer to the lowermost pin at the 180° position lying on the CW foil 164 adjacent the nonconductive area 168. Similarly, the units CW pin 54 will denote the pin in FIGURE 3 in the 40° position contacting the conductive segment 160 near the outer periphery of the disc. These units and tens designations have been chosen, as will be more apparent below, because all of the tens pins 00, 10, 20, 30 and 40 play a role in the drive motor control in connection with the tens digit of the selected storage pocket, and the same is true of the units pins 00–09 with respect to the units digit of the pocket.

FIGURES 8, 9, and 10 show the structural makeup of the individual selector buttons or keys that are used to select the storage pocket that it is desired to index to the access station, and further illustrate one key in sequenial stages of depression ending up in a latched condition. Essentially, each row on the keyboard contains a plurality of such keys 172 biased outwardly to their reset positions by helical expansion springs 174. Each key carries a follower pin 176 engaging a cam surface 178 in a cutout portion of a latching bar 180. The bar is normally urged toward a stationary support 182 by a helical compression spring 184, but may be pulled in the opposite or downward direction by energizing a solenoid 186 acting on an armature 188 connected to the latching bar.

As shown in FIGURE 8, both of the keys 172 are in their reset positions. In FIGURE 9 the lower key has been partially depressed causing the follower pin 176 to ride ly on the raised portion of the cam surface 178 and force the latching bar downward. In FIGURE 10 the lower key has been completely depressed, the pin 176 has overridden the raised portion of the cam surface and the spring 184 has returned the latching bar to its original position. The lower key is now latched in its depressed or selected position with the pin bearing against the vertical slope of the cam surface, and may be returned to its reset position only by energizing the solenoid 186. The electrical contacts associated with the keys 172 have been excluded from FIGURES 8–10 in the interest of simplicity.

FIGURE 11 illustrates a schematic diagram of the control circuit for the drive motor of the storage drum, and will be helpful in explaining the operation of the digital selector switch. A source of 115 volt 60 cycle alternating current is connected across input terminals 190 and applied to the primary winding of a stepdown transformer 192 through a circuit breaker 194 and a master start switch 196, the latter being operated through a button on the keyboard. The full 115 volt current source is also applied across the input diagonals of a full wave diode bridge recifier 198 through a relay contact arm K1–1. The bridge outputs are connected to the field 131 of the motor 128 and are also connected to the terminals of the respective relay contact arms K2–1, K2–2, K3–1 and K3–2 as shown. All of these switches are illustrated in their normal positions with their operating relays de-energized. The common ends of the K2 contact arms are connected across the armature 129 of drive motor 128 and control its operation in an on-off sense, while the position of the K3 contact arms determines the direction of rotation of the motor, same being CW with the K3 arms in the position shown.

The secondary winding of transformer 192 is connected across a second full wave diode bridge rectifier 200 whose 24 volt D.C. output is coupled to positive and negative supply lines 202 and 204, respectively. An indicator lamp 206 is connected between the lines to signal the on-off condition of the apparatus, as is the reset solenoid 186 and its actuating switch 208 for resetting the keyboard selection buttons as desired. The negative supply line 204 branches into a pair of switching units 210 and 212, indicated by broken line enclosures in the drawing. Unit 210 includes the switch arms 214, 216, and 218 connected in series in their normal positions as shown. These arms are actuated by the depression of associated selector keys in the tens row on the keyboard. Although only three switch arms have been shown to simplify the drawing, it will be understood that for a 50 pocket drum five such arms should be provided. The depression of one of the tens selector keys transfers its associated switch arm to one of the contact pins 00, 10, 20, 30, 40 mounted on the stator member. The pins all bear against the active surface of the commutator disc, and those associated with the tens digit control contact either the CW foil 164, the CCW foil 166 or the nonconductive area 168, the latter being represented in FIGURE 11 by the gap between the two foils.

In a similar manner, switching unit 212 includes switch arms 220, 222 and 224 connected in series in their unactivated or reset positions, and these arms are transferred by the depression of associated selector keys in the units row on the keyboard. Once again, although only three switch arms have been shown, in actual practice there would be ten such arms, one for each of the digits 0–9. These arms are also individually engageable with the contact pins 00–09 mounted on the stator member. The pins associated with the units selector keys ride on the commutator disc in contact with either the conductive segments 160 or the spoke portions 162 of nonconductive material, the latter being represented in FIGURE 11 by a gap opposite the middle pin. The segment and spoke area of the disc is also contacted by the units CW and CCW pins, 54, 53 respectively and the annular foils 164 and 166 are similarly contacted by the tens CW and CCW pins, 51, 52, respectively.

Relay coils K1 and K2 are connected in parallel between the positive supply line 202 and the units CW pin 54, and communicate with the tens CW pin 51 through a diode 226 and with the units and tens CCW pins 53, 52 respectively through a diode 228. Relay coil K4 is connected between the supply line 202 and the tens CW pin 51, while relay coil K3 is connected between the supply line 202 and the units and tens CCW pins 53, 52 respectively through the relay contact arm K4–1.

Having thus completed the structural description of the digital selector switch of the invention and its associated control circuitry, we may now consider the operation of same. Still referring to FIGURE 11, let us assume that switch arms 214, 216 and 218 correspond to the tens 1, 2 and 3 keys, respectively, and that switch arms 220, 222 and 224 correspond to the units 1, 2 and 3 keys, respectively. With the commutator disc in the position shown in FIGURE 11, the transfer of switch arms 216 and 222 would have no effect on the drive motor 128 since their associated contact pins 20, 02 both lie in the nonconductive areas on the surface of the disc. This means that the tens 20 and units 02 keys were previously selected, and that storage pocket 22 of the drum is presently indexed to the access station. Suppose now that the master switch 196 is closed to supply operating power to the circuit, and that the units 3 and tens 3 selector keys are depressed and latched on the keyboard to index pocket 33 to the access station. This will transfer switch arms 218 and 224 which in turn will energize the following relay coils: K1 and K2 through both the units and tens CW pins 54, 51 and K4 through the tens CW pin 51. Relay coil K1 now transfers its contact arm K1–1 to supply operating power to the rectifier bridge 198 in the drive motor circuit. At the same time, relay coil K2 transfers its contact arms K2–1 and K2–2. This completes a circuit path through the drive motor armature and initiates the rotation of same in the CW direction, simultaneously rotating both the storage drum 126 and the commutator disc 138, as seen in FIGURES 1 and 2. The energization of relay coil K4 transfers its contact arm K4–1 which effectively locks relay coil K3 out of the circuit and prevents the possibility of CCW rotation. As the drum and commutator disc rotate, eventually the nonconductive gap between CW foil 164 and CCW foil 166 will move up to a point opposite the pin 30 associated with the closed switch arm 218. Relay coil K4 is then de-energized and the first phase of the circuit operation is completed. CCW rotation is still prevented because the only "live" tens contact pin is in a nonconductive area on the commutator disc and no circuit path is completed through relay coil K3.

At this time, however, relay coils K1 and K2 remain energized through the units CW pin 54 and the closed switch arm 224, and therefore the drive motor continues to rotate in the CW direction. After a relatively short time, the commutator disc reaches a point where the pin 03 opposite the closed switch arm 224 of switching unit 212 enters a nonconductive spoke area 162 between two of the conductive segments 160. This opens the circuits through relay coils K1 and K2, their contact arms are transferred back to their original positions by spring action and the drive motor is de-energized with storage pocket 33 on the drum indexed to the access station, thus completing the second and final phase of the circuit operation.

Without going into further detail, it can be seen from FIGURE 11 that if switch arms 214 and 220 had been transferred corresponding to a selection of storage pocket 11, relay coils K1, K2 and K3 would have been energized through both the units and tens CCW pins 53, 52. This would have initiated CCW drum rotation through the same tens and units control phases to index pocket 11 of the drum to the access station.

As may be seen then, the digital selector switch of the present invention is effective to control the energization of a bidirectional load device in a manner dependent upon both existing and desired conditions, and implements the achievement of the latter in the most expeditious mode, i.e., via the shortest path in the disclosed embodiment. In one sense then, the switch actually performs a type of decoding function by reason of it making a CW or CCW decision based upon the supplied input information.

At the completion of each indexing operation or before the initiation of the next one, it will be necessary to unlatch or reset all of the depressed selector keys on the keyboard, and this may be accomplished, as described earlier, by manually closing the actuating switch 208 of the reset solenoid 186. As indicated schematically in FIGURE 11, a single solenoid may be employed to reset all of the keyboard rows by physically ganging together the four latching bars 180 and connecting them to the armature 188. It will also be appreciated that the diodes 226 and 228 serve necessary isolation functions in the control circuit. If diode 226 was not present, relay coil K4 could be energized through diode 228 and both the units and tens CCW pins 53, 52 and such a condition would be incompatible since relay coil K4 prevents CCW rotation when energized. Similarly, if diode 228 was absent, the CCW controlling relay coil K3 could be energized through both the units and tens CW pins, again presenting an incompatible situation.

With the foregoing in mind, we are now in a position to develop the precise manner of operation of the digital selector switch of the invention through a sequence of CW and CCW drum indexings, for which reference is made to FIGURES 3–7. In FIGURE 3 it will be noted that the tens 00 pin contacts the nonconductive area 168 in the inner annular area, and that the unit 00 pin contacts a nonconductive spoke 162 in the outer annular area. Under these conditions storage pocket 00 on the drum must therefore be located at the access station. Suppose now that it is desired to index storage pocket 25 to the access station, and that the tens 2 and units 5 selector buttons have accordingly been depressed and latched on the keyboard. Circuit paths are now completed from the tens 20 pin to the tens CW pin 51 and from the units 05 pin to the units CW pin 54, thus energizing the appropriate relay coils K1, K2, and K4 in FIGURE 11, and initiating drum rotation in the CW direction.

It should be noted at this point that the circuit path between the units 05 pin and CW pin 54 is redundant with respect to the one between the tens 20 pin and CW pin 51, and plays no part in the circuit control during the first phase of operation. Stated another way, CW rotation during the tens digit control phase requires the energization of relay coils K1, K2 and K4, and this condition is implemented in the first instance through the tens CW pin 51. Any further circuit paths for these relays that may be inherently present through any of the units pins are merely extraneous and have no effect on the control of the drive motor. In fact, it is entirely possible that a redundant path for relay coils K1 and K2 might initially exist through the units CCW pin 53. This would not affect the CW operation, however, because relay coil K4 would still be energized through the tens CW pin 51 and this would lock relay coil K3 out of the circuit, as explained earlier.

Figure 4:
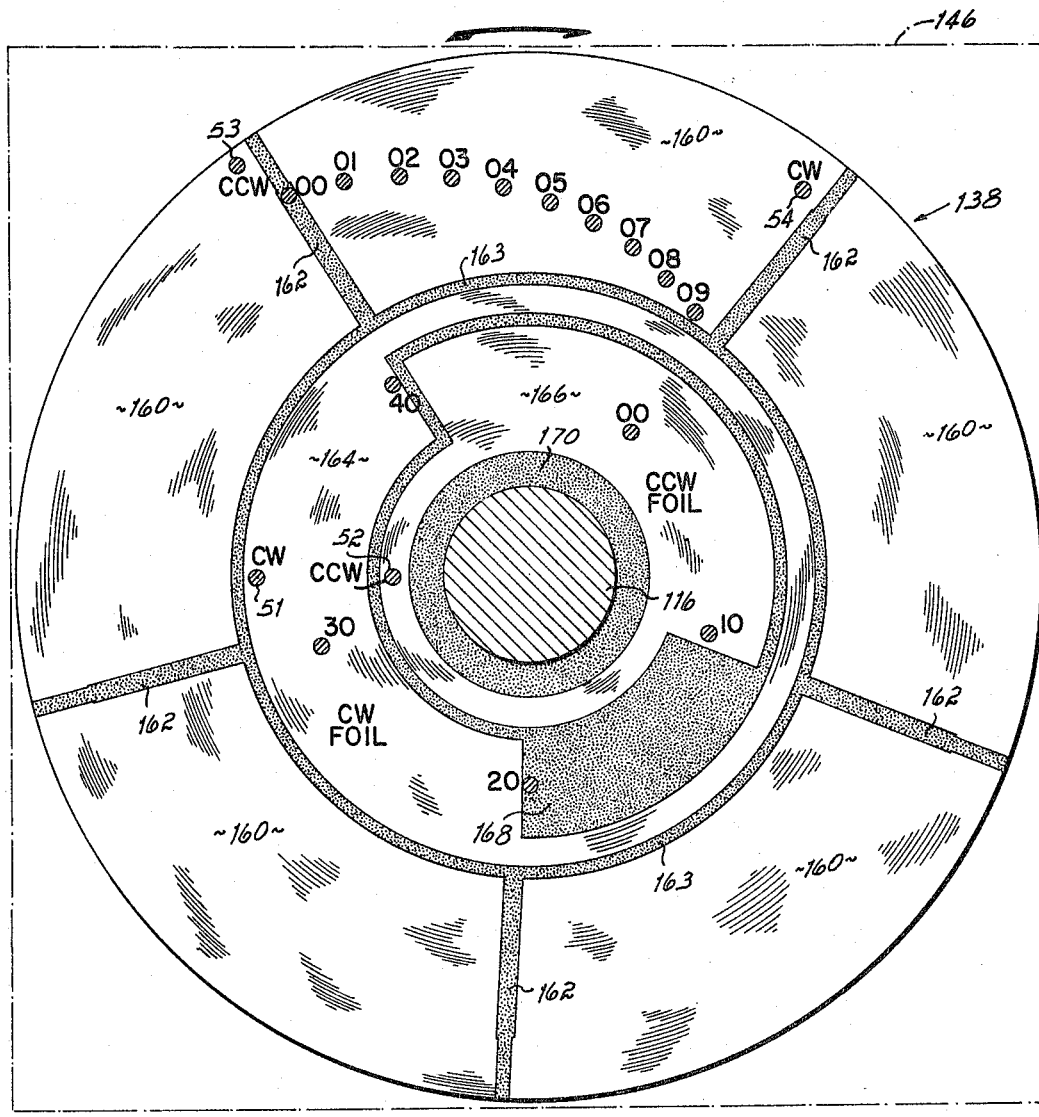
Figure 5:
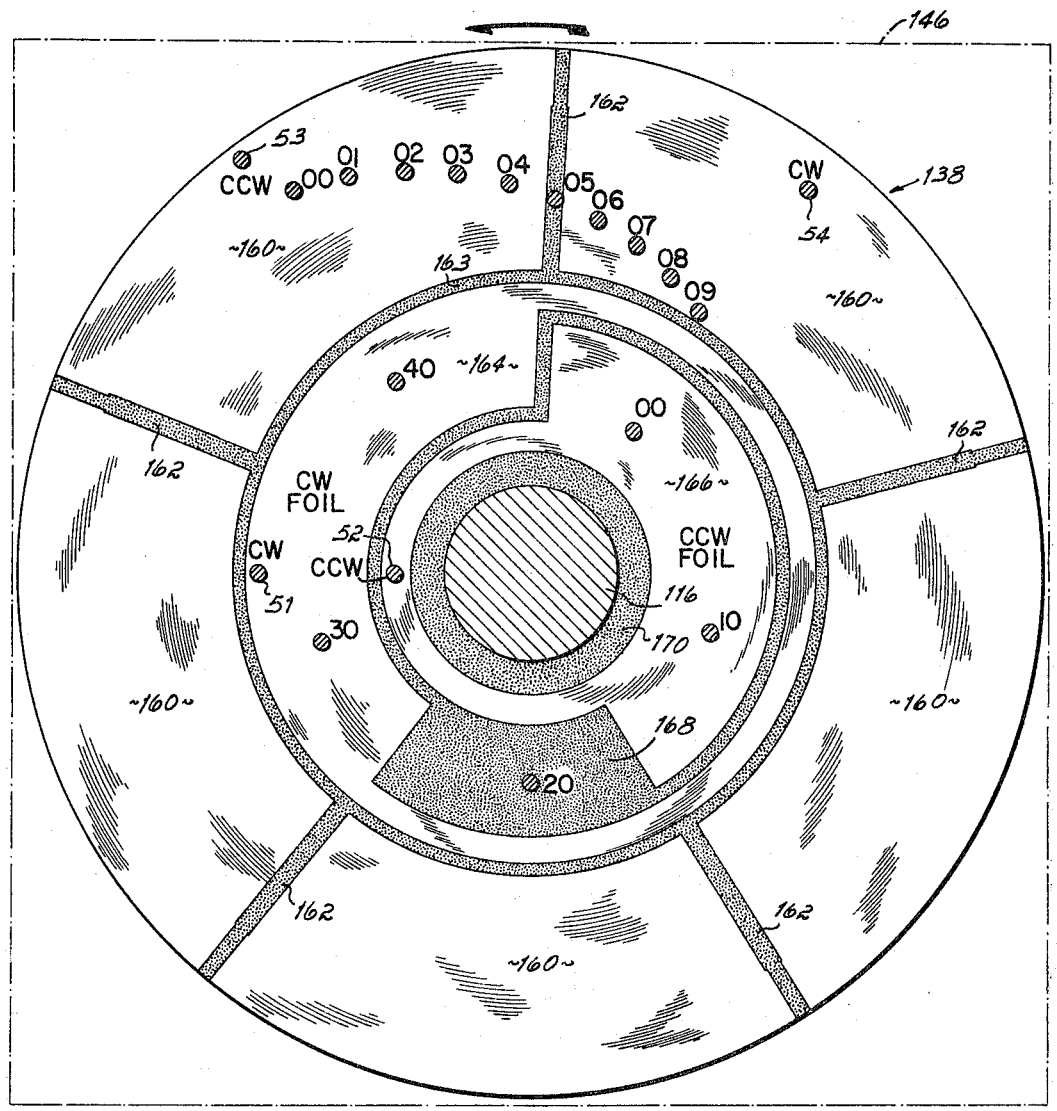

As the storage drum and commutator disc rotate in the CW direction as indicated by the arrow, the relatively thick portion of the nonconductive area 168 is eventually driven under the tens 20 pin, as shown in FIGURE 4. The circuit path across the CW foil 164 between this pin 20 and the tens CW pin 51 is then broken, but by now a further path has been established across one of the segments 160 between the "live" units 05 pin and the units CW pin 54 and takes over the control of the circuit. This path maintains relay coils K1 and K2 energized, which in turn permits continued CW rotation until a nonconductive spoke 162 is driven under the units 05 pin, as shown in FIGURE 5. At this point, storage pocket 25 has been indexed to the access station as desired and the K1 and K2 relay coils are de-energized. Their respective contact arms are then spring transferred back to their original positions which opens the power supply circuit to the drive motor, and the latter is itself de-energized. Actually, the retransfer of the K1-1 contact arm alone is sufficient to open the drive motor circuit. The retransfer of the K2 contact arms has the effect of short circuiting the armature winding of the motor 128, which permits the inductive energy stored in the winding to dissipate in a reverse direction surge. This provides a dynamic braking action in the motor and prevents any overtravel of the storage drum due to its rotational inertia. It should also be noted that at the time the nonconductive area 168 was driven under the tens 20 pin, the relay coil K4 became de-energized. This had no effect on the circuit, however, since although the CCW controlling relay coil K3 could then theoretically be energized, only the "live" tens pin could effect same and this pin was in a nonconductive area of the disc.

Figure 6:
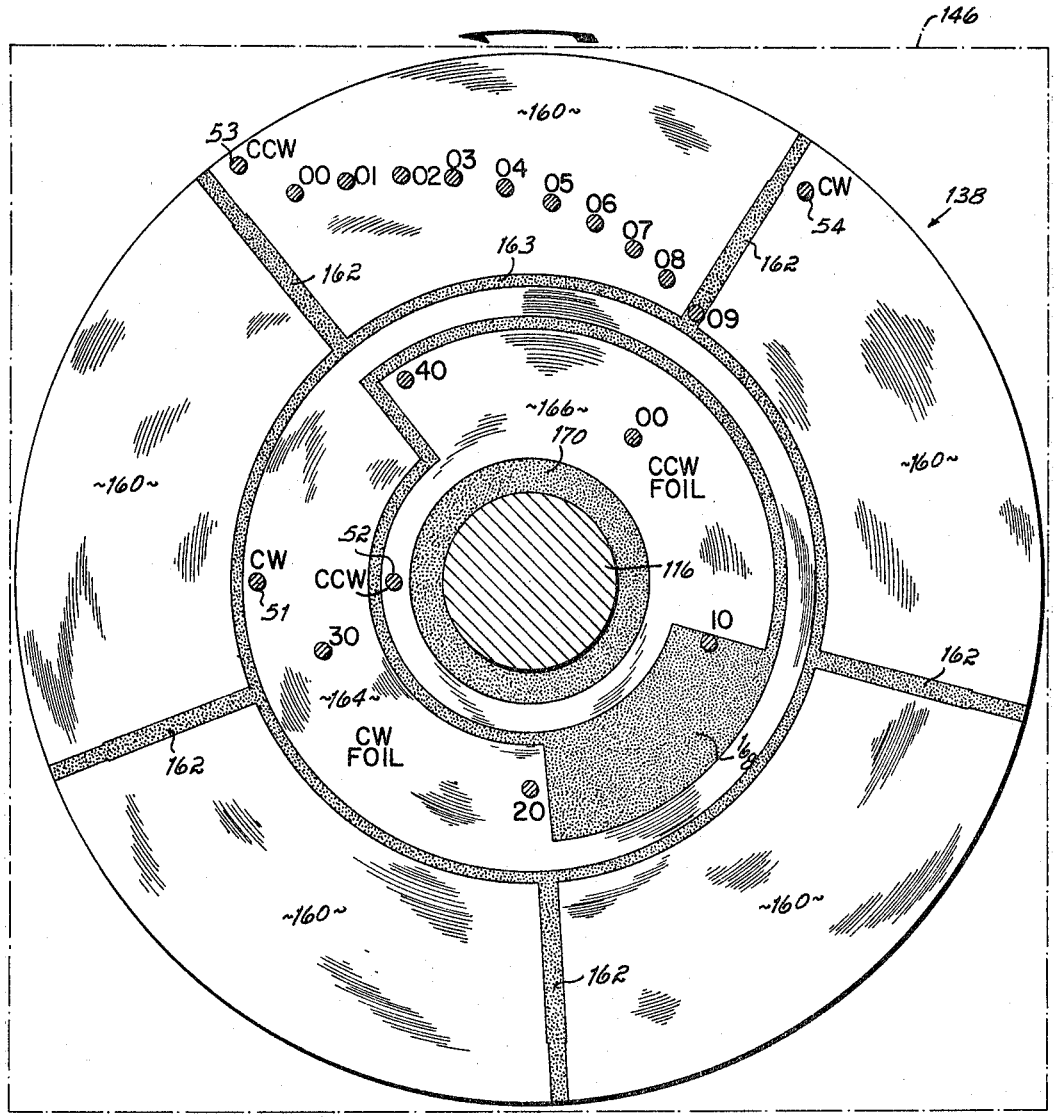
Figure 7:
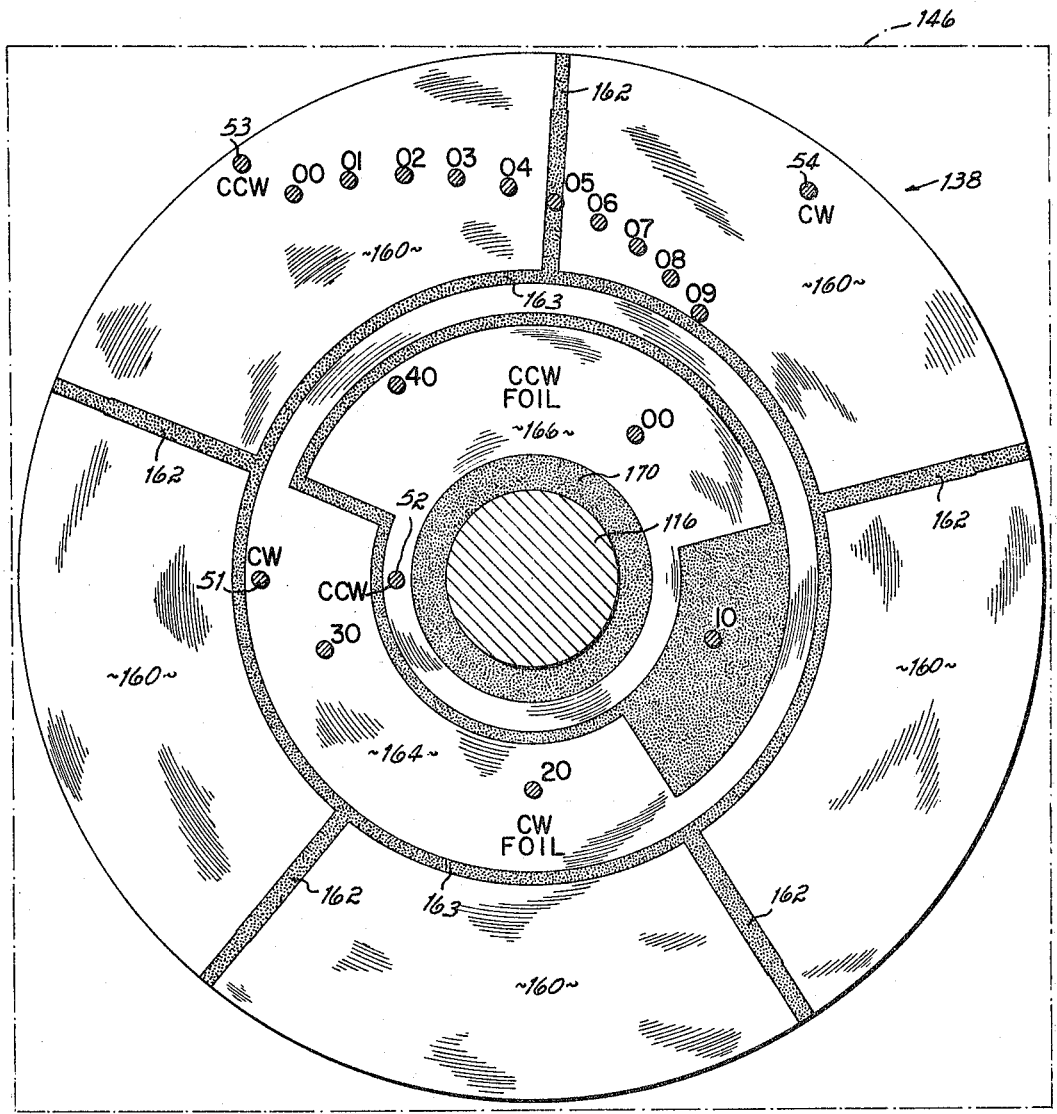

With pocket 25 of the drum thus indexed to the access station, as represented by the commutator disc position shown in FIGURE 5, let us now assume that it is desired to index storage pocket 15 to the station and that, after initially resetting the keyboard, the tens 1 and units 5 buttons have been depressed and latched. A circuit path is then completed across the CCW foil 166 between the tens 10 pin and the tens CCW pin 52, relay coils K1, K2 and K3 are energized and the drum begins to rotate in the CCW direction. The ineffectiveness of the units pin to control the circuit during this phase of operation becomes even more clear from FIGURE 5, where it is seen that initially the selected units 05 pin lies on one of the nonconductive spokes 62. This pin therefore completes no circuit paths and plays no part in the indexing operation during its first phase. After the drum and commutator disc have rotated approximately 75° in the CCW direction, the tens 10 pin enters the thick portion of the nonconductive area 168, as seen in FIGURE 6. This opens the circuit path for the relay coils across the CCW foil 166, but by this time the disc has been driven to a point where the appropriate coils are maintained in their energized conditions by a second path between the units 05 pin and the units CCW pin 53 over a conductive segment 160. The drum thus continues to rotate in the CCW direction, now in its second phase of operation, until a nonconductive spoke 162 is driven under the units 05 pin, as shown in FIGURE 7. At this point the relay coils are de-energized, their associated contact arms are retransferred to their original positions and the drum is halted with storage pocket 15 at the access station.

The foregoing examples serve to illustrate the functioning of the digital selector switch of the invention through both CW and CCW indexing operations, and it will be appreciated that the switch is effective to control the drive motor for rotating the storage drum from any existing discrete position to any desired discrete position via the shortest path. Although the switch has been disclosed in connection with a card filing system, it is to be understood that its general construction and manner of operation is adaptable to any environment in which a bidirectional load device must be selectively controlled through operational cycles from a present position to a desired position. The switch could be easily modified by one skilled in the art to control a drum or other load device having almost any number of two-digit positions. If there were a maximum of 100 discrete positions, for example, there would be 10 equally spaced and dimensioned conductive segments 160, the spacing between the units digit pins 00–09 would be halved, there would be 5 additional tens digit pins in the inner annular area and the relatively thick portion of the nonconductive area 168 would be only half as wide. In a similar manner, a minimum of 20 positions would require a switch having only two conductive segments 160, each spanning an arc of just under 180°, the units digit pins 00–09 would be spaced over a 180° arc, there would be two diametrically opposed tens digit pins and the relatively thick portion of the nonconductive area 168 would extend over a semi-circular arc.

While the invention has been described in connection with a specific embodiment thereof, it is to be understood that this is by way of illustration only and not by way of limitation. The scope of the invention is defined solely by the appended claims which should be construed as broadly as the prior art will allow.

What is claimed is:

1. A digital selector switch for controlling the movement of a bidirectional load device from any existing position to any desired position via the shortest path, comprising:
    (a) a fixedly mounted stator member,
    (b) first and second sets of electrical contacts carried by the stator member,
    (c) a rotatably mounted commutator disc cooperatively disposed adjacent the stator member and mechanically coupled to the load device for synchronous movement therewith,
    (d) a pair of conductive areas carried on the commutator disc in engagement with the first set of contacts and spaced from each other by a first insulative area, and
    (e) a plurality of conductive segments carried on the commutator disc in engagement with the second set of contacts and spaced from each other and from the conductive areas by a second insulative area, whereby a first circuit path established across one of the conductive areas between two of the first set of contacts controls the movement of the load device during a first phase of operation into an area represented by the second set of contacts, and in which a second circuit path then established across one of the conductive segments between two of the second set of contacts controls the movement of the load device during a second phase of operation until it reaches a desired position.

2. A digital selector switch as defined in claim 1 wherein the pair of conductive areas are generally annular in shape and one is nested within the other.

3. A digital selector switch as defined in claim 2 wherein the conductive segments are arcuate in shape and the second insulative area has a hub and spoke configuration.

4. A digital selector switch as defined in claim 3 wherein the number of conductive segments is equal to two more than the number of contacts in the first set.

5. A digital selector switch for controlling the indexing of a rotatable load device from any existing discrete position to any desired discrete position via the shortest path, either clockwise or counterclockwise, comprising:
   (a) a fixedly mounted stator member,
   (b) first and second sets of electrical contacts carried by the stator member,
   (c) a rotatably mounted commutator disc cooperatively disposed adjacent the stator member and mechanically coupled to the load device for synchronous rotation therewith,
   (d) a pair of generally annular conductive areas carried on the commutator disc in engagement with the first set of contacts, one of the areas being nested within the other area and separated therefrom by a first insulative area, and
   (e) a plurality of arcuate conductive segments carried on the commutator disc in engagement with the second set of contacts, each of the segments being spaced from each other and from the pair of conductive areas by a second insulative area having a hub and spoke configuration, whereby a first circuit path established across one of the annular conductive areas between two of the first set of contacts controls the rotation of the load device during a first phase of operation into an area represented by the second set of contacts, and in which a second circuit path then established across one of the arcuate conductive segments between two of the second set of contacts controls the rotation of the load device during a second phase of operation until it reaches a desired discrete position.

6. A digital selector switch as defined in claim 5 wherein the number of conductive segments is equal to two less than the number of contacts in the first set.

7. A digital selector switch for controlling the indexing of a rotatable member from any one of at least 20 discrete positions to any other of said positions via the shortest path, either clockwise or counterclockwise, comprising:
   (a) a stationary section,
   (b) first and second sets of electrical contacts mounted on the section, the first set being adapted to be utilized in a control capacity during the rotation of the member into an area represented by the second set and the latter being adapted to be utilized thereafter to complete the indexing of the member to a desired position,
   (c) a rotatable commutator co-operatively disposed adjacent the stationary section and coupled to the member for synchronous rotation therewith,
   (d) a pair of electrically conductive areas carried on the commutator in engagement with the first set of contacts and spaced from each other by a first nonconductive area, and
   (e) a plurality of additional electrically conductive areas carried on the commutator in engagement with the second set of contacts and spaced from each other and from the pair of electrically conductive areas by a second nonconductive area, the number of additional electrically conductive areas being equal to two less than the number of contacts in the first set.

8. A digital selector switch as defined in claim 7 wherein:
   (a) the pair of electrically conductive areas are generally annular in shape and one is nested within the other,
   (b) the additional electrically conductive areas are arcuate in shape, and
   (c) the second nonconductive area has a hub and spoke configuration.

9. A digital selector switch for controlling the indexing of a rotatable load device from any one of at least 20 discrete positions to any other one of said positions via the shortest path, either clockwise or counterclockwise, comprising:
   (a) a fixedly mounted stator member,
   (b) first and second sets of electrical contact pins carried by the stator member,
      (1) the first set including 2 common pins and at least 2 tens digit representing pins,
      (2) the second set including 2 common pins and at least 10 units digit representing pins, whereby any one of the discrete positions may be specified by a tens pin and a unit pin,
   (c) a rotatably mounted commutator disc co-operatively disposed adjacent the stator member and mechanically coupled to the load device for synchronous rotation therewith,
   (d) a pair of electrically conductive areas carried on the commutator disc in engagement with the first set of pins and spaced from each other by a first insulative area, and
   (e) a plurality of electrically conductive segments carried on the commutator disc in engagement with the second set of pins and spaced from each other and from the conductive areas by a second insulative area, whereby a first circuit path established across one of the conductive area between one of the common pins of the first set and one of the tens pins controls the rotation of the load device during a first phase of operation into an area represented by the second set of pins, and in which a second circuit path then established across one of the conductive segments between one of the common pins of the second set and one of the units pins controls the rotation of the load device during a second phase of operation until it reaches a desired one of said discrete positions.

10. A digital selector switch as defined in claim 9 wherein:
    (a) the pair of electrically conductive areas are generally annular in shape and one is nested within the other,
    (b) the electrically conductive segments are arcuate in shape, and
    (c) the second insulative area has a hub and spoke configuration.

11. A digital selector switch as defined in claim 10 wherein the number of electrically conductive segments is equal to the number of tens digit pins in the first set.

12. A control system including a digital selector switch for controlling the movement of a bidirectional load device from any existing position to any desired position via the shortest path, comprising:
    (a) a fixedly mounted stator member,
    (b) first and second sets of electrical contacts carried by the stator member,
    (c) a rotatably mounted commutator disc cooperatively disposed adjacent the stator member and mechanically coupled to the load device for synchronous movement therewith,
    (d) a pair of conductive areas carried on the commutator disc in engagement with the first set of contacts and spaced from each other by a first insulative area,
    (e) a plurality of conductive segments carried on the commutator disc in engagement with the second set of contacts and spaced from each other and from the conductive areas by a second insulative area,
    (f) means operable to establish a first circuit path across one of the conductive areas between two of the first set of contacts to control the movement of the load device during a first phase of operation into an area represented by the second set of contacts, and (g) means operable to establish a second circuit path across one of the conductive segments between two of the second set of contacts to control the movement of the load device during a second phase of operation until it reaches a desired position.

13. A control system including a digital selector switch for controlling of the indexing of a rotatable load device from any existing discrete position to any desired discrete position via the shortest path, either clockwise or counterclockwise, comprising:
(a) a fixedly mounted stator member,
(b) first and second sets of electrical contacts carried by the stator member,
(c) a rotatably mounted commutator cooperatively disposed adjacent the stator member and mechanically coupled to the load device for synchronous rotation therewith,
(d) a pair of generally annular conductive areas carried on the commutator in engagement with the first set of contacts, one of the areas being nested within the other area and separated therefrom by a first insulative area,
(e) a plurality of equidistantly spaced arcuate conductive segments carried on the commutator and engageable with the second set of contacts, each of the segments being electrically insulated from each other and from the pair of conductive areas,
(f) means operable to establish a first circuit path across one of the annular conductive areas between two of the first set of contacts to control the rotation of the load device during a first phase of operation into an area represented by the second set of contacts, and
(g) means operable to establish a second circuit path across one of the arcuate conductive segments between two of the second set of contacts to control the rotation of the load device during a second phase of operation until it reaches a desired discrete position.

14. A control system including a digital selector switch for controlling the indexing of a rotatable load device from any one of at least 20 discrete positions to any other one of said positions via the shortest path, either clockwise or counterclockwise, comprising:
(a) a fixedly mounted stator member,
(b) first and second sets of electrical contact pins carried by the stator member,
  (1) the first set including 2 common pins and at least 2 tens digit representing pins,
  (2) the second set including 2 common pins and at least 10 units digit representing pins, whereby any one of the discrete positions may be specified by a tens pin and a units pin,
(c) a rotatably mounted commutator cooperatively disposed adjacent the stator member and mechanically coupled to the load device for synchronous rotation therewith,
(d) a pair of electrically conductive areas carried on the commutator in engagement with the first set of pins and spaced from each other by a first insulative area,
(e) a plurality of electrically conductive segments carried on the commutator in engagement with the second set of pins, said segments being electrically insulated from each other and from the said conductive areas,
(f) means to establish a first circuit path across one of the conductive areas between one of the common pins of the first set and one of the tens pins to control the rotation of the load device during a first phase of operation into an area represented by the second set of pins, and
(g) means to establish a second circuit path across one of the conductive segments between one of the common pins of the second set and one of the units pins to control rotation of the load device during a second phase of operation until it reaches a desired one of said discrete positions.

References Cited by the Examiner
UNITED STATES PATENTS

| | | | |
|---|---|---|---|
| 2,853,564 | 9/1958 | Gahagan | 200—11 |
| 2,896,033 | 7/1959 | Hartz | 200—11 |
| 2,985,726 | 5/1961 | Handel | 200—11 |
| 3,030,848 | 4/1962 | Wick | 200—11 X |
| 3,042,763 | 7/1962 | Strathearn | 200—11 X |

ROBERT K. SCHAEFER, *Primary Examiner.*
KATHLEEN H. CLAFFY, *Examiner.*
J. R. SCOTT, *Assistant Examiner.*